UNITED STATES PATENT OFFICE.

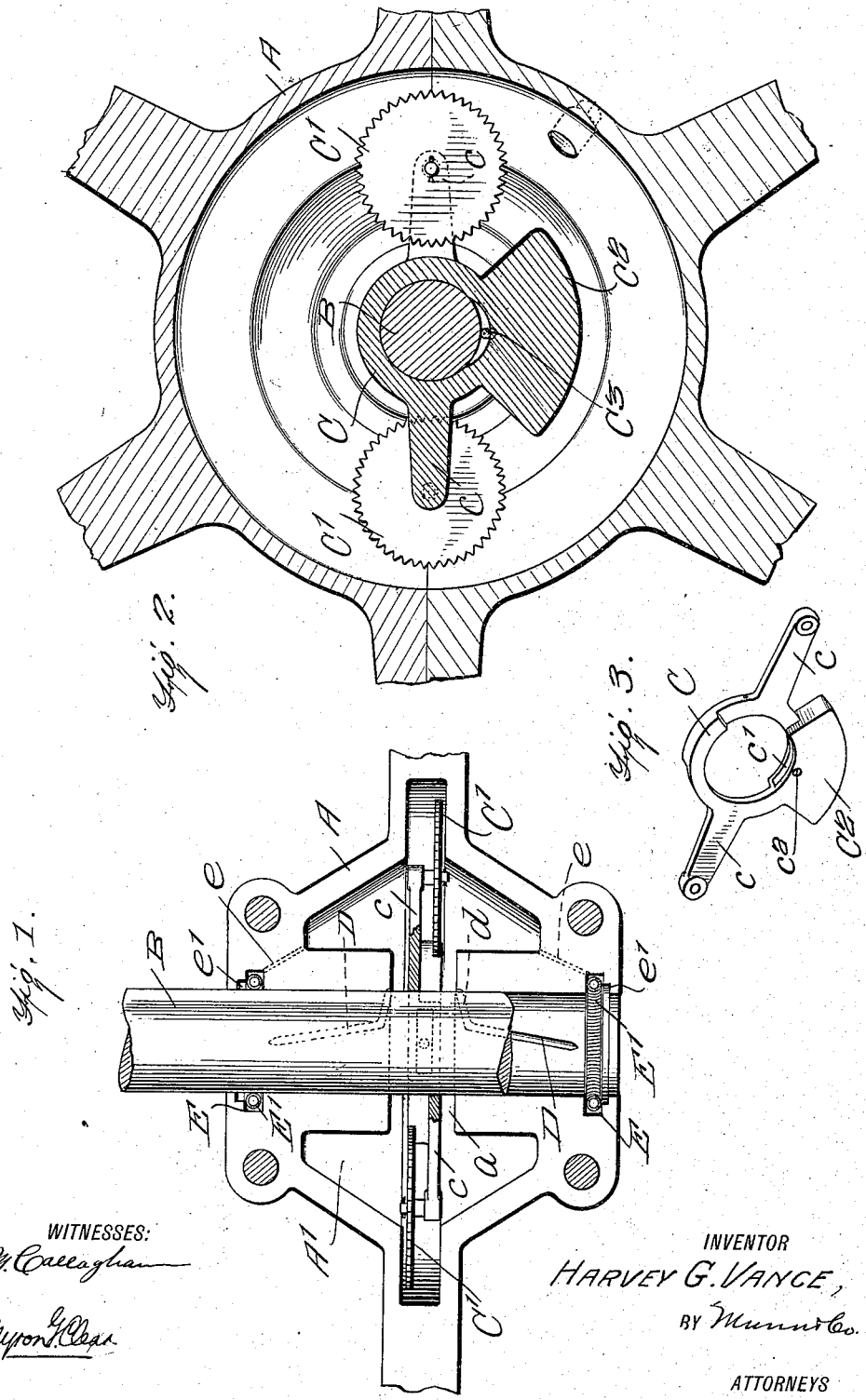

HARVEY GEORGE VANCE, OF ST. LOUIS, MISSOURI.

LUBRICATING-PULLEY.

1,171,280.   Specification of Letters Patent.   Patented Feb. 8, 1916.

Application filed March 11, 1915. Serial No. 13,715.

*To all whom it may concern:*

Be it known that I, HARVEY G. VANCE, a citizen of the United States, and a resident of the city of St. Louis, in the State of Missouri, have invented a certain new and useful Improvement in Lubricating-Pulleys, of which the following is a specification.

My present invention relates to improved means for lubricating pulleys, applicable to various forms of such pulleys, wherein the lubricating member or ring is required to be locked to the shaft of the pulley, and more particularly to improvements in the construction and arrangement described and claimed in my Patent Number 1012482, dated December 19, 1911, my primary object being to provide a lubricating member or ring with means which automatically prevent its rotation within the pulley and obviates the necessity of set screws or other fastening members for securing the same to the shaft.

My invention also aims to provide certain other improvements which with the above will be better understood by reference to the accompanying drawings, forming a part of this specification, and in which—

Figure 1 is an enlarged face view of the hub portion of one section of the pulley; Fig. 2 is a transverse section through the same, and Fig. 3 is a detail perspective view of the lubricating ring, without its wheels, removed.

Referring now to these figures, the pulley, as in my patent above referred to, has a hub portion A provided with a lubricant holder A', annular in form and surrounding its bore through which the pulley shaft B extends, this lubricant holder communicating with the bore and consequently with the shaft B, by an annular chamber $a$, as seen in Fig. 1.

In accordance with my present invention, the lubricating ring C, which is disposed around the shaft within the annular chamber $a$, and which, as in my patent above referred to, is provided with arms $c$ extending within the annular lubricant holder A' and provided therein with wheels C', is provided with a counter weight $C^2$, as best seen in Figs. 2 and 3, between its arms $c$ in order to prevent rotation of the lubricating ring C as this structure will do when the pulley is rotated at a comparatively slow speed and a light lubricating oil is used. This ring C is further provided, however, with a slot partially surrounding its central opening, as shown at $c'$, which extends partly around the shaft B projecting through the said opening, the slot being substantially shallow at its opposite end and being adapted for the reception of a friction ball or roller $C^3$, the function of which is to bind in the shallow ends of the slot $c'$ and against the surface of the shaft B, when the pulley is rotating at high speed or a heavy lubricating fluid is used, in order to limit the rotative movement of the lubricating ring with respect to the shaft B, and thus operate to automatically lock the lubricating ring against rotative movement with the pulley. The slot $c'$ may have a small drain opening $c^2$ leading therefrom to permit of the discharge of lubricant which might otherwise collect in the slot and interfere with free movement of the ball o rroller $C^3$. Furthermore, as in my patent above referred to, the bore of the hub A is provided with longitudinally extending inclined grooves D, extending along the shaft B, and the inner end portions of which grooves communicate with the annular chamber $a$ and consequently with the lubricant holder A', it being noted that in the present case, the said inner end portions of grooves D, as shown at $d$, project at an acute angle with respect to the longitudinal axis of the bore of the hub A, so as to form what is practically a screw, forcing the lubricant out into the grooves D. In addition to the foregoing, the bore of the hub A is provided adjacent its outer ends with annular grooves E, communicating with the lubricant holder A' by means of apertures $e$, and each serving to contain a collecting ring in the form of a draw spring E' which is disposed within the recess and sprung around the shaft B in direct engagement therewith. It will also be noted that in the present case the bore of the hub A is also provided with relatively small annular recesses $e'$ adjacent to and beyond the annular recesses E just mentioned, which hold the collected lubricant out of the influence of the collecting rings E'.

Thus, by means of the improvements above described, and as shown in the drawings, I am enabled to greatly increase the effectiveness of the lubricating arrangement as shown in my patent above referred to, in connection with which the present invention is particularly designed as an improvement, although readily applicable to other and analogous types of lubricating pulleys, particularly in connection with the lubricating ring C, which may be used with any type of lubricating pulley employing a ring which of necessity must be prevented from rotation with the pulley.

While my improved lubricating arrangement, as thus described is particularly adapted for use in connection with lubricating pulleys, it may be utilized with equal facility and effect in connection with various other types of wheels rotating on shafts or axles, and I wish to be understood as reserving all such uses as to which my invention may be logically applied.

I claim:—

1. In a lubricating pulley of the character described, a lubricating ring disposed around the pulley shaft and having a counter weight normally holding the same against movement with the pulley and having other means automatically limiting its rotation with respect to the shaft.

2. In a lubricating pulley of the character described, a lubricating ring disposed around the pulley shaft and having a counter weight whereby to normally prevent its rotation with respect to the shaft and also having locking means engageable with the shaft to limit relative movement.

3. In a lubricating pulley of the character described, a lubricating ring disposed around the pulley shaft and having means for automatically locking the same to the pulley shaft upon rotative movement thereof.

4. In a lubricating pulley of the character described, a lubricating ring disposed around the pulley shaft and having an inner groove extending partly around the shaft and provided with shallow ends, and a roller disposed in the groove whereby to automatically lock the said ring with the shaft upon rotative movement of the former with respect to the shaft.

5. A lubricating pulley including a hub portion having a lubricant chamber and a bore through which the shaft extends, provided with annular recesses adjacent its ends around the shaft and communicating with the lubricant chamber, and draw springs disposed within the said recesses and sprung around the shaft in direct engagement therewith.

6. A lubricating pulley including a hub portion having a lubricant chamber and a bore through which the shaft extends, provided with annular recesses adjacent its ends around the shaft and communicating with the lubricant chamber, and draw springs disposed within the said recesses and sprung around the shaft in direct engagement therewith, said bore also having annular grooves beyond the first named grooves and communicating therewith.

7. A lubricating pulley including a hub portion having a lubricant chamber and a bore through which the shaft extends, said bore being provided with longitudinal inclined grooves extending along the shaft and communicating at their inner ends with the lubricant chamber, and said inner ends of said grooves projecting at an acute angle with respect to the longitudinal axis of the bore, all for the purpose described.

8. In a lubricating device of the character described, a lubricating ring disposed around a shaft, and having means automatically engageable with the shaft whereby to limit relative movement thereof.

HARVEY GEORGE VANCE.

Witnesses:
MAYMIE T. VANCE,
JOHN L. WALKER.